United States Patent [19]

Cook et al.

[11] Patent Number: 4,481,250

[45] Date of Patent: Nov. 6, 1984

[54] VINYL ACETATE-ETHYLENE BINDER COMPOSITION HAVING GOOD WET TENSILE STRENGTH AND LOW HEAT SEAL TEMPERATURE FOR NONWOVEN PRODUCTS

[75] Inventors: Gerald R. Cook, Wyomissing; Phillip A. Mango, Fogelsville, both of Pa.

[73] Assignee: Air Products and Chemicals, Inc., Allentown, Pa.

[21] Appl. No.: 518,515

[22] Filed: Jul. 29, 1983

[51] Int. Cl.$^3$ .............................................. B32B 27/00
[52] U.S. Cl. .................................. 428/290; 428/288; 428/913; 524/502
[58] Field of Search ........................ 428/288, 290, 913; 524/502

[56] References Cited

U.S. PATENT DOCUMENTS

| | | |
|---|---|---|
| 3,222,419 | 12/1965 | Jubilee et al. |
| 3,671,382 | 6/1972 | Pierce . |
| 4,075,387 | 2/1978 | Trapasso et al. ..................... 428/288 |
| 4,332,850 | 6/1982 | Iacoviello .......................... 428/288 |

*Primary Examiner*—James J. Bell
*Attorney, Agent, or Firm*—Michael Leach; E. Eugene Innis; James C. Simmons

[57] ABSTRACT

An emulsion composition is disclosed which provides a binder having good wet tensile strength and low heat seal temperature for nonwoven products which comprises an aqueous dispersion of a mixture consisting essentially of 50 to 95 wt % of a vinyl acetate-ethylene copolymer and 5 to 50 wt % of a vinyl acetate-ethylene-crosslinking monomer copolymer.

20 Claims, No Drawings

VINYL ACETATE-ETHYLENE BINDER COMPOSITION HAVING GOOD WET TENSILE STRENGTH AND LOW HEAT SEAL TEMPERATURE FOR NONWOVEN PRODUCTS

TECHNICAL FIELD

The invention relates to vinyl polymer emulsions and, more particularly, the invention relates to vinyl acetate-ethylene copolymer compositions for bonding nonwoven products.

BACKGROUND OF THE INVENTION

In many commercial applications, it is necessary to attach a bonded nonwoven material to some other substrate. For example, in baby diapers the inner liner of the diaper is typically a nonwoven fabric comprising rayon, polyester or polypropylene fibers bonded together with some polymeric composition. The outer layer of the diaper is generally a polyethylene film and between the two layers is the absorbent padding.

It is quite apparent from an economic viewpoint that a fast, efficient way to attach the nonwoven inner liner to the polyethylene film is desired by the industry. Additionally, since the inner liner is exposed to urine, it must exhibit good wet strength in order to maintain its integrity and hold the absorbent padding in place. Currently, there is no fast, efficient way of doing this.

The state of the art binder compositions which can produce the necessary wet strength normally have heat seal temperatures that are too high to make such a single step process possible due to prohibitive time and energy costs and the physical melting constraint of the polyethylene film.

This problem exists in the manufacture of diapers, sanitary napkins, and the like and is indicative of similar problems in air-laid type paper embossing.

One approach which is used to solve this problem in the diaper area is a two-step procedure. First the nonwoven inner liner is bonded with a self-crosslinking binder to achieve the necessary wet strength. Then this inner liner is attached to the polyethylene outer layer with an adhesive composition. This procedure is very slow, costly and inefficient.

In air-laid type paper embossing two separate binders may be used. The first binder is a weak wet strength, good heat sealing binder which is used to treat the paper prior to embossing. After embossing, the paper is then treated with a self-crosslinking binder to achieve wet strength. This process also is a slow, inefficient operation which is costly, produces stiff feel to the paper and has tendencies to delaminate binder layers giving weak or inconsistent wet strength.

SUMMARY OF THE INVENTION

The invention provides a binder composition which is prepared by blending two vinyl acetate-ethylene copolymer emulsions. The first copolymer contains about 60 to 95 wt% vinyl acetate and 5 to 40 wt% ethylene, the second copolymer contains 60 to 95 wt% vinyl acetate, 5 to 40 wt% ethylene and up to about 10 wt% crosslinking mono-olefinically unsaturated monomer. The blend contains about 50 to 95 wt% of the first copolymer and about 5 to 50 wt% of the crosslinking copolymer.

As an advantage of the invention there is provided an emulsion composition that exhibits the strength of a self-crosslinking polymer emulsion with the heat sealing properties of a non-crosslinking polymer. When used in the diaper-type nonwoven product this emulsion composition is applied to the inner nonwoven liner and produces good wet strength. This inner layer can then be heat sealed at a relatively low temperature to the polyethylene outer layer in a fast, neat single step.

In the air-laid type paper embossing area, the wood pulp can be pre-treated with the emulsion composition so that during the thermal embossing step, the polymer composition will flow producing in a single step the neat clean embossing. Subsequently, curing will develop the full wet strength.

DETAILED DESCRIPTION OF THE INVENTION

There is provided a resin binder composition having good tensile strength and good heat sealability as a binder for nonwoven products comprising a mixture consisting essentially of (a) 50 to 95 wt% of a copolymer containing 60 to 95 wt% vinyl acetate and 5 to 40 wt% ethylene and (b) 5 to 50 wt% of a copolymer containing 60 to 95 wt% vinyl acetate, 5 to 40 wt% ethylene and up to about 10 wt% crosslinking mono-olefinic monomer copolymerizable with vinyl acetate and ethylene.

There is also provided a resin emulsion composition for use as a binder for nonwoven products comprising an aqueous dispersion of the mixture of copolymers.

In another embodiment there is also provided a nonwoven product bonded with the binder composition of the invention deposited from the emulsion composition.

In a preferred embodiment the mixture of copolymers contains about 65 to 90 wt% of the vinyl acetate-ethylene-containing copolymer and 10 to 35 wt% of the vinyl acetate-ethylene-crosslinking monomer copolymer. It is also preferred that the first copolymer contain about 75 to 95 wt% vinyl acetate and 15 to 25 wt% ethylene and that the crosslinking copolymer contain about 70 to 80 wt% vinyl acetate, 15 to 25 wt% ethylene and about 4 to 6 wt% crosslinking monomer with N-methylol acrylamide being the preferred crosslinking monomer.

Other well known crosslinking mono-olefinically unsaturated monomers that can be used in the practice of the invention include N-methylol methacrylamide, the lower alkyl ethers of the N-methylol acrylamides, acrylamide, methacrylamide, and acrylic acid. When such copolymerizable crosslinking monomers are incorporated into the crosslinking copolymer it is preferably done at about a 4 to 8 wt% level.

It is preferred that both the non-crosslinking and the crosslinking vinyl acetate-ethylene copolymer emulsions be prepared in the presence of a non-polyvinyl alcohol protective colloid or surfactants. Desirably, the non-crosslinking copolymer emulsion is prepared using hydroxyethyl cellulose and nonionic alkoxylated surfactants.

Suitable vinyl acetate-ethylene copolymer and vinyl acetate-ethylene-crosslinking monomer copolymer emulsions for blending as the composition of the invention can be prepared by the following process.

Vinyl acetate and ethylene are copolymerized in the presence of a protective colloid or surfactants in an aqueous medium under pressures not exceeding about 100 atm and in the presence of a catalyst which is added incrementally, the aqueous system being maintained by a suitable buffering agent at a pH of about 2 to 6. The process involves first a homogenization in which the vinyl acetate suspended in water is thoroughly agitated in the presence of ethylene under the working pressure to effect solution of the ethylene in the vinyl acetate while the reaction medium is gradually heated to polymerization temperature. The homogenization period is followed by a polymerization period during which the catalyst, which consists of a main catalyst, or initiator, and may include an activator, is added incrementally.

In the case of the preparation of the crosslinking copolymer, the crosslinking olefinically unsaturated copolymerizable monomer may be added all at once with the vinyl acetate and ethylene or incrementally over the course of the polymerization reaction.

Various free-radical forming catalysts can be used in carrying out the polymerization of the monomers, such as peroxide compounds. Combination-type catalysts employing both reducing agents and oxidizing agents can also be used, i.e. a redox system. The reducing agent is often referred to as an activator and the oxidizing agent as an initiator. Suitable reducing agents or activators include bisulfites, sulfoxylates, or other compounds having reducing properties such as ferrous salts and tertiary aromatic amines, e.g. N,N-dimethyl aniline. The oxidizing agents include hydrogen peroxide, organic peroxides such as benzoyl peroxide, t-butyl hydroperoxide and the like, persulfates, such as ammonium or potassium persulfate, perborates and the like. Specific combination-type catalysts or redox systems which can be used include hydrogen peroxide and zinc formaldehyde sulfoxylate; hydrogen peroxide, ammonium persulfate or potassium persulfate with sodium metabisulfite, sodium bisulfite, ferrous sulfate, dimethyl aniline, zinc formaldehyde sulfoxylate or sodium formaldehyde sulfoxylate. It is preferred to use t-butyl hydroperoxide and sodium formaldehyde sulfoxylate. Other types of catalysts that are well known in the art can also be used to polymerize the monomers. Catalyst is typically employed in an amount of 0.1 to 2%, preferably 0.25 to 0.75%, based on the weight of the vinyl acetate introduced into the polymerization system. The activator is ordinarily added in aqueous solution in an amount that is generally 0.25 to 2 times the amount of the catalyst.

It is also possible to use redox systems containing a reducing agent which is formaldehyde-free as disclosed in U.S. Pat. No. 4,360,632 which is incorporated by reference.

The emulsifying agents which can be used in the polymerization recipe include ionic and nonionic surfactants, preferably the nonionic types which are well known to those skilled in the polymerization art. Suitable nonionic emulsifying agents include polyoxyethylene condensates.

The concentration range of the total amount of emusifying agents useful is from 0.5 to 5% based on the aqueous phase of the emulsion regardless of a solids content.

Latex stabilizers are also advantageously used. When the vinyl acetate-ethylene copolymer latexes are to have a small average particle size, for example, below 0.25 microns, an ethylenically unsaturated acid having up to 6 carbon atoms is used as the stabilizer, such as acrylic acid, maleic acid, and the like. These unsaturated acids impart increased stability to the latexes. They tend to copolymerize with the monomers in the system, the amount of such unsaturated acid used is suitable 0.1 to 3 wt% based on the interpolymer, preferably 0.2 to 1 wt%.

On the other hand, when the latex has an average particle size above 0.25 microns, a protective colloid can be used in the polymerization mixture as the stabilizing agent. It is advantageous to maintain the colloid content of the latexes between about 0.05 and 2 wt% based on the total latex. Polyvinyl alcohol and hydroxyethyl cellulose are examples of particularly advantageous colloids.

If it is desired to maintain the pH of the system at a desired value, there may suitably be added an alkaline buffering agent of any convenient type which is compatible with the stabilizing agent. The amount of buffer is generally about 0.1 to 0.5 wt% based on the monomers.

Vinyl acetate-ethylene copolymer latexes of relatively high solids contents can be directly produced having a solids contents of 45 to 60%. They can, of course, be easily thinned by the addition of water to lower solids contents of any desired value.

The reaction temperature can be controlled by the rate of catalyst addition and by the rate of heat dissipation. Generally, it is advantageous to maintain a mean temperature of about 50° C. during the polymerization of the monomers and to avoid temperature much in excess of 80° C. While temperatures as low as 0° C. can be used, economically the lower temperature limit is about 30° C.

The reaction time will also depend upon other variables such as the temperature, the catalyst and the desired extent of polymerization. It is generally desirable to continue the reaction until less than 0.5% of the vinyl acetate remains unreacted.

In carrying out the polymerization, an amount of the vinyl acetate is initially charged to the polymerization vessel and saturated with ethylene. Most advantageously, at least about 10% of the total vinyl acetate to be polymerized is initially charged, preferably at least about 20%, and the remainder of the vinyl acetate is added incrementally during the course of the polymerization. The charging of all the vinyl acetate initially is also contemplated with no additional incremental supply.

When reference is made to incremental addition, whether of vinyl acetate, crosslinking copolymerizable monomer, catalyst or activator, substantially uniform additions, both with respective quantity and time, are contemplated. Such additions are also referred to as "delay" additions.

The quantity of ethylene entering in the copolymer is influenced by the pressure, the agitation and the viscosity of the polymerization medium. Thus, to increase the ethylene content of the copolymer high pressures, greater agitation and a low viscosity are employed. The process of forming the vinyl acetate-ethylene copolymer and vinyl acetate-ethylene crosslinking monomer copolymer emulsions generally comprises the preparation of an aqueous solution containing at least some of the emulsifying agent and stabilizer, and the pH buffering system. This aqueous solution and the initial charge of the vinyl acetate are added to the polymerization vessel and ethylene pressure is applied to the desired value. As previously mentioned, the mixture is thoroughly agitated to dissolve ethylene in the vinyl acetate and in the water phase. Conveniently, the charge is brought to polymerization temperature during this agitation period. The polymerization is then initiated by introducing initial amounts of the catalyst and of the activator when used. After polymerization has started, the catalyst and the activator are incrementally added as required to continue polymerization. The crosslinking copolymerizable monomer and the remaining vinyl acetate, if any, may be added as separate delays.

As mentioned, the reaction is generally continued until the residual vinyl acetate content is below 0.5%. The completed reaction product is then allowed to cool to about room temperature while sealed from the atmosphere. The pH is then suitably adjusted to a value in the range of 4.5 to 7, preferably 6 to 6.5 to insure maximum stability.

Another method for producing vinyl acetate-ethylene-containing copolymer emulsions of this invention comprises first forming an aqueous emulsion of vinyl acetate and stabilizer and charging this emulsion to a reactor. The reactor is pressurized with ethylene to an ethylene-equilibrium pressure of about 200 to 500 psig. The resulting reaction mixture is adjusted to a temperature from about 10° to 30° C. Polymerization is initiated by the addition of a catalyst at a rate such that the reaction mixture is brought to a temperature of from 45° to 85° C., preferably 50° to 60° C., within a period of one hour or less, preferably 30 minutes. The polymerization is continued until the vinyl acetate content is reduced below about 0.7 wt% of the copolymers.

The crosslinking monomer can be added to the reaction vessel with the initial charge or as a delay or a combination of the two.

This latter polymerization process is the subject of U.S. Pat. No. 4,332,850 which is incorporated by reference.

The binder composition of the invention is prepared simply by blending or mixing the vinyl acetate-ethylene copolymer emulsion with the vinyl acetate-ethylene-crosslinking monomer copolymer emulsion. This binder composition is used to prepare nonwoven products, or fabrics, by a variety of methods know to the art which, in general, involve the impregnation of a loosely assembled mass of fibers with the binder latex, followed by moderate heating to dry the mass. In the case of the present invention, this moderate heating also serves to cure the binder by forming a cross-linked interpolymer. Before the binder is applied it is, of course, mixed with a suitable catalyst for the crosslinking monomer. For example, for the N-methylol acrylamide, an acid catalyst such as mineral acids, e.g. hydrogen chloride, or organic acids, e.g. oxalic acid, or acid salts such as ammonium chloride, are suitable used as known in the art. The amount of catalyst is generally about 0.5 to 2% of the total resin.

The starting fiber layer or mass can be formed by any one of the conventional techniques for depositing or arranging fibers in a web or layer. These techniques including carding, garnetting, air-laying and the like. Individual webs or thin layers formed by one or more of these techniques can also be laminated to provide a thicker layer for conversion into a fabric. Typically, the fibers extend in a plurality of diverse directions in general alignment with the major plane of the fabric, overlapping, intersecting and supporting one another to form an open, porous structure.

When reference is made to "cellulose" fibers, those fibers containing predominantly $C_6H_{10}O_5$ groupings are meant. Thus, examples of the fibers to be used in the starting layer are the natural cellulose fibers such as wood pulp, cotton and hemp and the synthetic cellulose fibers such as rayon, and regenerated cellulose. Often the fiber starting layer contains at least 50% cellulose fibers, whether they be natural or synthetic, or a combination thereof. Often the fibers in the starting layer may comprise natural fibers such as wool, jute; artificial fibers such as cellulose acetate; synthetic fibers such as polyamides, nylon, polyesters, acrylics, polyolefins, i.e. polyethylene, polyvinyl chloride, polyurethane, and the like, alone or in combination with one another.

The fibrous starting layer is subjected to at least one of the several types of bonding operations to anchor the individual fibers together to form a self-sustaining web. Some of the better known methods of bonding are overall impregnation, or printing the web with intermittent or continuous straight or wavy lines or areas of binder extending generally traversely or diagonally across the web and additionally, if desired, along the web.

The amount of binder, calculated on a dry basis, applied to the fibrous starting web is that amount which is at least sufficient to bind the fibers together to form a self-sustaining web and suitably ranges from about 3 to about 100% or more by weight of the starting web, preferably from about 10 to about 50 wt% of the starting web. The impregnated web is then dried and cured. Thus the fabrics are suitably dried by passing them through an air oven or the like and then through a curing oven. Typical conditions to achieve optimal cross-linking are sufficient time and temperature such as drying at 150° to 200° F. (66° to 93° C.) for 4 to 6 minutes, followed by curing at 300° to 310° F. (149° to 154° C.) for 3 to 5 minutes or more. However, other time-temperature relationships can be employed as is well known in the art, shorter times at higher temperatures or longer times at lower temperatures being used.

The bonded nonwoven product may then be attached or joined to another substrate or material by a heat sealing process. Such heat sealing processes include the steps of passing the nonwoven product and substrate between two cylindrical rollers heated to a suitable temperature and having an applied pressure where the rollers meet; or pressing the nonwoven product and substrate between parallel heated plates for a specific time.

Nonwoven products prepared in accordance with this invention have wet and dry tensile strength values approaching or comparable to those nonwoven products prepared using vinyl acetate-ethylene-crosslinking monomer binders alone. More importantly, these nonwovens products have the outstanding advantage of relatively low heat sealability temperatures.

Theoretically, both heat seal temperature and wet tensile strength are functions of the degree of crosslinking of the polymer. As crosslinking increases, heat seal temperature and wet tensile strength both increase.

In contrast, the binder composition of the invention does not follow this expected pattern. Instead, wet tensile strength is maintained at a relatively high level while heat seal temperature is decreased significantly. This makes it possible to heat seal two materials together at a low temperature and still have good wet tensile strength. Specifically, at about a 30:70 ratio of crosslinking to noncrosslinking copolymers, up to about 85% of the wet tensile strength of the fully self-crosslinked vinyl acetate-ethylene copolymer with essentially the same heat seal temperature of the non-self-crosslinking vinyl acetate-ethylene copolymer is achieved.

Illustrative of the types of nonwoven products which can be made from wood pulp and, optionally, other fibers utilizing the invention are nonwovens such as disposable diapers, sanitary napkins, underpads and surgical masks.

In the examples the following commercially available vinyl acetate-ethylene copolymer emulsions were used:

Airflex®-105—79% vinyl acetate; 16% ethylene; 5% N-methylol acrylamide; 52.5 wt% solids. (A-105).

Airflex-120—69% vinyl acetate, 25% ethylene; 6% N-methylol acrylamide; 52.5 wt% solids. (A-120).

Airflex-410—84% vinyl acetate; 16% ethylene; 55 wt% solids. (A-410).

Airflex is a registered trademark of Air Products and Chemicals, Inc. for polymer emulsions.

The nonwoven substrates used in the following examples were carded rayon and air-laid unbonded embossed paper substrate.

The cross machine direction tensile (CMD) strength, wet and dry, were measured according to ASTM D1682.

The heat seal temperature test consisted of measuring the relative heat seal temperature of a polymer film in a specified thickness or weight per unit area range and was as follows:

1. About 150–250 grams of a 25% total solids binder formulation was prepared.

2. Leneta cards 7.5×10 inches were conditioned overnight (minimum 14 hours) at 72° F./50% relative humidity. After the cards were laid, a puddle of the binder formulation at the leading edge of a #30 rod was slowly drawn down by applying moderate pressure to the rod ends. The coated cards were quickly placed in an oven to dry for 5 minutes at 300°±10° F. The coated cards were then reconditioned at 72° F./50% relative humidity overnight. A 4×9 inch template was cut and weighed to 0.01 g.

The applied coat weight was the difference in weight per unit area between the uncoated card and the coated card expressed in lb/3000 ft². Thus, $$\frac{\text{Weight (g) } 4 \times 9 \text{ in. card} \times 26.455 = \text{lb/3000 ft}^2 \text{ coated}}{-\text{Weight (g) } 7.5 \times 10 \text{ in. card} \times 12.49 = \text{lb/3000 ft}^2 \text{ uncoated}}$$
$$\text{coating weight} = \text{lb/3000 ft}^2$$

The coating weight should be 7±2 lb/3000 ft² in order to achieve reproducible heat seal temperatures. If the coating weight is outside the range, as it might be for different operators using the same wire wound rod, the rod will have to be changed accordingly. A lower number rod will reduce coating weight.

Two inch strips were cut from the 4×9 inch card parallel to the 4 inch side. Using a 1 inch precision strip cutter, 2×1 inch strips were cut, coating the 1 inch dimension perpendicular to the 4 inch side. All cuts were made with the coated side up.

Uncoated Leneta cards were then similarly cut. The back side of these blank cards, containing an enamel-clay paper coating, was used as a surface to which the coated side of the Leneta card was heat sealed.

A Sentinel heat sealer Model No. 12AS was adjusted to operate at 40 psi, 100° F. and a five second dwell time. The uncoated side of the blank Leneta cards was placed on top of the coated side of the sample. The samples were placed in the heat sealer with a one square inch area under pressure. After the 5 pressure was released. After the sample had cooled to room temperature, the top piece was peeled off the coated sample and the amount of fiber tear on the coated sample, based on visual estimate, was recorded. If a fiber tearing bond over at least 50% of the one square inch seal area was not achieved, the seal temperature was increased to 110° F., a 10° F. increment. The test was then repeated. The temperature was increased in 10° F. increments to achieve a 50 to 100% fiber tear bond. The temperature at which a seal demonstrating at least a 50% fiber tear was achieved was the heat seal temperature.

To determine hand, which is the assessment of fabric feel via the sense of touch, the following test measured a combination of the resistances due to a flexural rigidity and surface friction in a fabric.

The hand was measured by a method utilizing a Thwing-Albert Handle-O-Meter in which the lower the number, the softer the hand.

The resistances due to surface friction and flexural rigidity of a specimen are measured as the the force required by a blade in forcing the specimen a set distance into a slot of parallel edges. The hand was considered to be the average of four readings taken on both sides and in both directions of the specimen and was recorded in grams per standard with a specimen.

Samples to be tested were conditioned at 72° F. and 50% relative humidity for at least 12 hours prior to test. Specimens 3×3 inches were cut so that one side was perpendicular to the machine direction and one side was parallel. After calibrating the Handle-O-Meter, the test specimens were evaluated and the value of hand was considered to be the average of readings taken on both sides and in both directions.

EXAMPLE 1

In this example samples of carded rayon were impregnated with the emulsion samples shown in Table 1 which also sets forth the tensile strengths and hand of the impregnated carded rayon and the heat seal temperature of the emulsion polymer.

TABLE 1

| RUN | EMULSION COMPOSITION | % ADD-ON | CATALYSTS (%) TOTAL BASED ON SOLIDS | CROSS MACHINE DIRECTION TENSILE (CMD) STRENGTH | | HEAT SEAL TEMP (°F.) | HAND |
|---|---|---|---|---|---|---|---|
| | | | | DRY | WET | | |
| 1 | A-105 | 35 | 1.0 | 1.54 | .84 | 290 | 2.0 |
| 2 | A-120 | 35 | 1.0 | 1.50 | .81 | 350 | 2.0 |
| 3 | 50/50 A-410/A-105 | 35 | 0.5 | 1.58 | .82 | 200 | 3.5 |
| 4 | 50/50 A-410/A-120 | 35 | 0.5 | 1.49 | .90 | 190 | 3.0 |
| 5 | A-410 | 35 | 0.0 | 1.15 | .26 | 130 | 2.7 |

As can be seen from Table 1, both wet and dry tensiles for the blends of Runs 3 and 4 were as high as for the self-crosslinking polymers in Runs 1 and 2. The heat seal temperature for the copolymer binders in the blends of Runs 3 and 4 were unexpectedly lower than what would have been predicted for a 50—50 mixture while the hand was stiffer.

EXAMPLE 2

Another series of binder emulsions alone and in combination were tested on carded rayon. The relevant experimental and resulting data are presented in Table 2.

TABLE 2

| RUN | EMULSION COMPOSITION | % ADD-ON | CATALYSTS (%) TOTAL BASED ON SOLIDS | CROSS MACHINE DIRECTION TENSILE (CMD) STRENGTH | | HEAT SEAL TEMP (°F.) | HAND |
| --- | --- | --- | --- | --- | --- | --- | --- |
| | | | | DRY | WET | | |
| 6 | A-105 | 31 | 1.0 | 1.70 | 1.00 | 290 | 2.0 |
| 7 | 10/90 A-105/A-410 | 35 | 0.1 | 1.57 | 0.72 | 140 | — |
| 8 | 30/70 A-105/A-410 | 34 | 0.3 | 1.85 | 0.86 | 165 | — |
| 9 | 50/50 A-105/A-410 | 35 | 0.5 | 1.88 | 0.86 | 200 | — |
| 10 | A-410 | 35 | 0.0 | 1.25 | 0.20 | 130 | — |

Assuming the wet strength values for A-105 and A-410 emulsion copolymers are additive when blended, the expected values for Runs 7, 8 and 9 would be 0.28, 0.44 and 0.60, respectively. Surprisingly, the measured wet tensile strengths were 0.72, 0.86 and 0.86, respectively.

A similar analysis of the heat seal temperatures shows unexpected results.

EXAMPLE 3

In this example various emulsion compositions were applied to unbonded embossed substrate. The relevant data is summarized in Table 3.

TABLE 3

| RUN | EMULSION COMPOSITION | % ADD-ON | CATALYSTS (%) TOTAL BASED ON SOLIDS | CROSS MACHINE DIRECTION TENSILE (CMD) STRENGTH | | HAND | HEAT SEAL TEMP (°F.) |
| --- | --- | --- | --- | --- | --- | --- | --- |
| | | | | DRY | WET | | |
| 11 | A-410 | 22 | 0.0 | 2.29 | 0.14 | 22.4 | 130 |
| 12 | 50/50 A-105/A-410 | 22 | 0.5 | 3.85 | 1.78 | 20.0 | 200 |
| 13 | A-105 | 22 | 1.0 | 4.04 | 2.13 | 19.0 | 290 |

The expected wet tensile strength for Run 12, based on the data of Runs 11 and 13, would be about 1.14 not the measured value of 1.78.

From the above examples it can be seen that a binder composition which comprises a blend of about 5 to 50 wt% self-crosslinking vinyl acetate-ethylene copolymer and about 50 to 95 wt% non-crosslinking vinyl acetate-ethylene binder, preferably 10-35 wt% and 65 to 90 wt% respectively, provides for relatively high wet tensile strengths while affording relatively low heat seal temperatures. For heat sealing applications requiring a heat seal temperature of less than about 210° F., for example about 190° to 200° F., 50/50 blends of the two copolymers are suitable. Blends which contained self-crosslinking copolymer in amounts greater than about 50 wt% are not preferred because the wet tensile strength improvement is marginal while heat seal temperature increases rapidly. Where heat sealing temperatures less than the 190° to 200° F. are required, blends containing about 10 to 30 wt% self-crosslinking copolymer should prove suitable. When the amount of self-crosslinking copolymer in the blend falls below about 10 wt%, particularly below 5 wt%, there will be insufficient crosslinking within the copolymers to provide requisite wet tensile strength.

The binder composition of the invention does not follow the expected pattern. Instead, wet tensile strength is maintained at a high level while heat seal temperature is decreased significantly. Thus it is possible to heat seal at a low temperature and still have good wet tensile strength. The binder combines the heat sealing properties and thermoplasticity of an uncrosslinked polymer with the excellent wet strength of a fully crosslinked polymer. In addition, it imparts a medium hand to nonwoven fabrics, resists discoloration upon aging, and leaves no residual odor in the finished product.

STATEMENT OF INDUSTRIAL APPLICATION

The invention provides a binder composition having good wet strength and good low temperature heat sealability in nonwovens allowing end use manufacturers to use a single binder and still use an inexpensive thermal bonding step to adhere the nonwovens to another substrate. Additionally, thermal embossing is possible in paper bonded with the composition with the resulting embossed paper having good wet strength.

We claim:

1. An emulsion composition providing a binder having good wet tensile strength and heat sealability for nonwoven products comprising an aqueous dispersion of a mixture consisting essentially of:
   (a) 50 to 95 wt% copolymer A containing 60 to 95 wt% vinyl acetate and 5 to 40 wt% ethylene, and
   (b) 5 to 50 wt% copolymer B containing 60 to 95 wt% vinyl acetate, 5 to 40 wt% ethylene and up to about 10 wt% crosslinking mono-olefinically unsaturated monomer.

2. The composition of claim 1 in which the mixture consists essentially of 65 to 90 wt% copolymer A and 10 to 35 wt% copolymer B.

3. The composition of claim 1 in which the vinyl acetate content is 75 to 85 wt% and the ethylene content is 15 to 25 wt% of copolymer A, and the vinyl acetate is 70 to 80 wt%, the ethylene is 15 to 25 wt% and the crosslinking mono-olefinically unsaturated monomer is 4 to 8 wt% of copolymer B.

4. The composition of claim 2 in which the vinyl acetate content is 75 to 85 wt% and the ethylene content is 15 to 25 wt% of copolymer A, and the vinyl acetate is 70 to 80 wt%, the ethylene is 15 to 25 wt% and the crosslinking mono-olefinically unsaturated monomer is 4 to 8 wt% of copolymer B.

5. The composition of claim 1 in which the crosslinking olefinically unsaturated monomer is N-methylol acrylamide, N-methylol methacrylamide, the lower alkyl ethers of N-methylol acrylamide or N-methylol methacrylamide, acrylamide, methacrylamide, or acrylic acid.

6. The composition of claim 4 in which the crosslinking mono-olefinically unsaturated monomer is 4–6 wt%.

7. A nonwoven product comprising a web of fibers bonded together with a binder deposited from an emulsion composition comprising an aqueous dispersion of a mixture consisting essentially of
   (a) 50 to 95 wt% copolymer A containing 60 to 95 wt% vinyl acetate and 50 to 40 wt% ethylene, and
   (b) 5 to 50 wt% copolymer B containing 60 to 95 wt% vinyl acetate, 5 to 40 wt% ethylene and up to about 10 wt% crosslinking mono-olefinically unsaturated monomer.

8. The nonwoven product of claim 7 in which the mixture consists essentially of 65 to 90 wt% copolymer A and 10 to 35 wt% copolymer B.

9. The nonwoven product of claim 7 in which the vinyl acetate content is 75 to 85 wt% and the ethylene content is 15 to 25 wt% in copolymer A and the vinyl acetate is 70 to 80 wt%, the ethylene is 15 to 25 wt%, and the crosslinking mono-olefinically unsaturated monomer is 4 to 8 wt% of copolymer B.

10. The nonwoven product of claim 8 in which the vinyl acetate content is 75 to 85 wt% and the ethylene content is 15 to 25 wt% in copolymer A and the vinyl acetate is 70 to 80 wt%, the ethylene is 15 to 25 wt%, and the crosslinking mono-olefinically unsaturated monomer is 4 to 8 wt% of copolymer B.

11. The nonwoven product of claim 7 in which the crosslinking mono-olefinically unsaturated monomer is N-methylol acrylamide, N-methylol methacrylamide, the lower alkyl ethers of N-methylol acrylamide or N-methylol methacrylamide, acrylamide, methacrylamide, or acrylic acid.

12. The nonwoven product of claim 10 in which the crosslinking olefinically unsaturated monomer is 4–6 wt%.

13. An emulsion composition providing a binder having good wet tensile strength and heat sealability for nonwoven products comprising an aqueous dispersion of a mixture consisting essentially of
   (a) 50 to 95 wt% copolymer A containing 60 to 95 wt% vinyl acetate and 5 to 40 wt% ethylene, and
   (b) 5 to 50 wt% copolymer B containing 60 to 95 wt% vinyl acetate, 5 to 40 wt% ethylene and up to about 10 wt% N-methylol acrylamide.

14. The composition of claim 13 in which the mixture consists essentially of 65 to 90 wt% copolymer A and 10 to 35 wt% copolymer B.

15. The composition of claim 14 in which the vinyl acetate is 75 to 85 wt% and the ethylene is 15 to 25 wt% in copolymer A and the vinyl acetate is 70 to 80 wt%, ethylene is 15 to 25 wt% and the N-methylol acrylamide is 4 to 6 wt% of copolymer B.

16. The composition of claim 13 in which the vinyl acetate is 75 to 85 wt% and the ethylene is 15 to 25 wt% in copolymer A and the vinyl acetate is 70 to 80 wt%, ethylene is 15 to 25 wt% and the N-methylol acrylamide is 4 to 6 wt% of copolymer B.

17. A nonwoven product comprising a web of fibers bonded together with a binder deposited from the emulsion of claim 13.

18. A nonwoven product comprising a web of fibers bonded together with a binder deposited from the emulsion of claim 14.

19. A nonwoven product comprising a web of fibers bonded together with a binder deposited from the emulsion of claim 15.

20. A nonwoven product comprising a web of fibers bonded together with a binder deposited from the emulsion of claim 16.

* * * * *